United States Patent [19]

Huffman

[11] Patent Number: 5,796,926
[45] Date of Patent: Aug. 18, 1998

[54] METHOD AND APPARATUS FOR LEARNING INFORMATION EXTRACTION PATTERNS FROM EXAMPLES

[75] Inventor: Scott B. Huffman, Menlo Park, Calif.

[73] Assignee: Price Waterhouse LLP, New York, N.Y.

[21] Appl. No.: 469,981

[22] Filed: Jun. 6, 1995

[51] Int. Cl.$^6$ .................................................. G06F 15/18
[52] U.S. Cl. ............................ 395/77; 395/50; 395/54; 395/75
[58] Field of Search ........................ 364/419.19, 419.08; 395/22, 23, 75, 77, 50, 54

[56] References Cited

U.S. PATENT DOCUMENTS

| | | | |
|---|---|---|---|
| 5,034,898 | 7/1991 | Lu | 364/513 |
| 5,212,821 | 5/1993 | Gorin | 395/22 |
| 5,222,197 | 6/1993 | Teng | 395/77 |
| 5,355,510 | 10/1994 | Sekine | 395/800 |
| 5,481,650 | 1/1996 | Cohen | 395/77 |
| 5,487,135 | 1/1996 | Freeman | 395/75 |
| 5,504,840 | 4/1996 | Hiji | 395/77 |

OTHER PUBLICATIONS

E. Brill, "Some advances in transformation–based part of speech tagging." In *Proceedings of the Twelfth National Conference on Artificial Intelligence* (AAAI–94), pp. 722–727 (1994).

Chinchor et al., "MUC–5 evaluation metrics." In *Proceedings of the Fifth Message Understanding Conference MUC–5* Morgan Kaufmann, San Mateo, CA (1993).

R. J. Hall, "Learning by failing to explain." *Machine Learning*, 3(1) pp. 45–77 (1988).

Hobbs, et al., "FASTUS: A system for extracting information from natural–language text," *Technical Report No. 519*, SRI International, (1992).

J.R. Hobbs, "The generic information extraction system," In *Proceedings of the Fifth Message Understanding Conference (MUC–5)* Morgan Kaufmann, San Mateo, CA (1993).

Lehnert et al., "UMass/Hughes: Description of the CIRCUS system used for MUC–5," In *Proceedings of the Fifth Message Understanding Conference MUC–5* Morgan Kaufman, San Mateo, CA (1993).

George Miller, "Five papers on WordNet," *International Journal of Lexicography* 3 pp. 235–312 (1990).

Mitchell et al., "Explanation–based generalization: A Unifying view," *Machine Learning* 1 (1986).

M. Pazzani, "Learning to predict and explain: An integration of similarity–based, theory driven, and explanation–based learning," *Journal of the Learning Sciences* 1(2) pp. 153–199 (1991).

E. Riloff, "Automatically constructing a dictionary for information extraction tasks," In *Proceedings of the Eleventh National Conference on Artificial Intelligence* (AAAI–93) pp. 811–816 (1993).

Soderland et al., "Wrap–Up: A trainable discourse module for information extraction," *Journal of Artificial Intelligence Research* (JAIR) 2 pp. 131–158 (1994).

K. VanLehn, "Learning one subprocedure per lesson," *Artificial Intelligence* 31(1) pp. 1–40 (1987).

*Primary Examiner*—Michael Horabik
*Assistant Examiner*—Albert K. Wong
*Attorney, Agent, or Firm*—Townsend and Townsend and Crew LLP; Kenneth R. Allen

[57] ABSTRACT

A system is provided for learning extraction patterns (grammar) for use in connection with an information extraction system. The learning system learns extraction patterns from examples of texts and events. The patterns can then be used to recognize similar events in other input texts. The learning system builds new extraction patterns by recognizing local syntactic relationships between the sets of constituents within individual sentences that participate in events to be extracted. The learning system generalizes extraction patterns it has learned previously through simple inductive learning of sets of words that can be treated synonymously within the patterns. Sets of patterns for a sample extraction task perform nearly at the level of a hand-built dictionary of patterns.

5 Claims, 4 Drawing Sheets

METHOD AND APPARATUS FOR LEARNING INFORMATION EXTRACTION PATTERNS FROM EXAMPLES

BACKGROUND OF THE INVENTION

This invention relates to information retrieval and more particularly to mechanisms for information retrieval using searching tools which employ pattern recognition techniques extracted from examples.

Information extraction can be defined as the detection and extraction of particular events of interest from text. Examples include FASTUS from SRI International in Menlo Park, Calif., and CIRCUS from the University of Massachusetts of Amherst, Mass.

Although significant progress has been made on information extraction systems in recent years, coding the knowledge these systems need to extract new kinds of information and events is an arduous and time-consuming process. The dictionaries of syntactic and semantic patterns used to recognize each type of event are typically manually built by a team of highly-trained specialists. As the amount of on-line text (newswires, World Wide Web documents, etc.) and the number of users with access continues to grow, however, there is a need to extract an ever-widening diversity of types of information and events. Having specialists hand-build extraction knowledge for this diversity of extraction tasks is untenable.

The work which is perhaps most closely related to the present invention is Riloff's AutoSlog system (E. Riloff "Automatically constructing a dictionary for information extraction tasks." *Proceedings of the Eleventh National Conference on Artificial Intelligence* (AAAI-93 pp. 811–816, 1993). AutoSlog is a knowledge acquisition tool that uses a training corpus to generate proposed extraction patterns for the CIRCUS extraction system. A user either verifies or rejects each proposed pattern. AutoSlog does not try to recognize relationships between multiple constituents,; rather, it builds smaller patterns that recognize instances of single role-fillers. Later stages of CIRCUS then combine these instances into larger events.

SUMMARY OF THE INVENTION

According to the present invention, a system is provided for learning extraction patterns (grammar) for use in connection with an information extraction system. The system initially learns patterns directly from user-provided examples of texts and events. The patterns are used to recognize relationships between key constituents based on local syntax (within a single sentence). The technique used by the present invention to learn extraction patterns may be viewed as a combination of 1) explanation-based learning using an overgeneral and incomplete domain theory, and 2) simple inductive learning of sets of words that can be treated synonymously within the patterns. Sets of patterns for a sample extraction task perform nearly at the level of a hand-built dictionary of patterns.

In a specific embodiment, the extraction task is to identify corporate management changes, and an example of such a system is disclosed. The present invention may considered to be a system for extraction of patterns is as explanation-based learning with an overgeneral and incomplete domain theory.

The invention will be better understood upon reference to the following detailed description and the accompanying drawings.

DESCRIPTION OF SPECIFIC EMBODIMENTS

This invention focuses on a computer-based method and system for learning to extract information within individual sentences, rather than on full-scale extraction which typically includes a sentence-level extraction phase followed by a "merging" phase in which information drawn from different sentences is combined. The context of the invention is a natural language processing (NLP) type information retrieval system.

Figure 1:
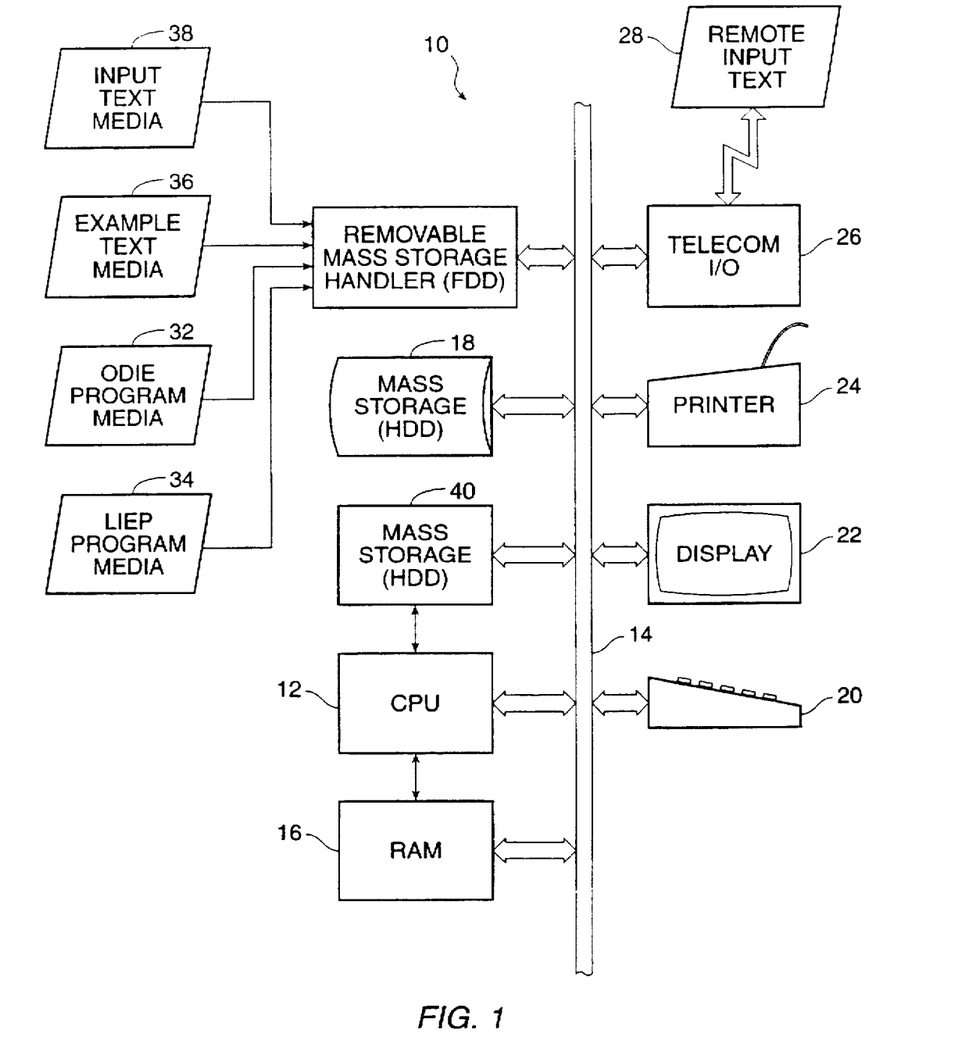
FIG. 1 is a hardware block diagram of a system according to the invention.

Referring to FIG. 1, an information retrieval system 10 according to the invention may comprise a CPU 12 which data address and control functions interconnected with other subsystems either directly or through a bus system 14, including coupling to a random access memory means 16 for storage of executable programs and active data. Also connected to the bus is one or more mass storage means (fixed disk drives) 18, 40, a manual input means 20 such as a keyboard and pointer, an output display means 22, an output printer 24, a network or telecommunications input (and output) device 26 for use for example in accessing input text 28 from remote data sources, and a removable mass storage handling means (diskette drive) 30 for receiving media containing an on-line information extraction (ODIE) computer program system 32, a "learning information extraction patterns" (LIEP) computer program system 34, example text 36 and additional input text 38. The contents of the various media forming the applications defining the systems according to the invention are loaded through a removable mass storage handler 42 (such as a diskette drive) and may be stored substantially permanently in the mass storage system 18, along with any operating systems needed to facilitate operation of the hardware components. Example text 36 (on removable media) is used primarily for training the LIEP system 34 "off-line", i.e., prior to processing of unknown text, or in some cases interactively, if the user is an "oracle" whose job it is to define patterns. The LIEP system 34 is used to build or augment a pattern or example dictionary 40 stored in the mass storage means 40 useful for the ODIE system in performing NLP-based information extraction, as hereinafter explained. The ODIE system 32 performs information extraction on any input text, whether provided from a local medium (38) or remote sources (28).

The purpose of the ODIE system is to recognize and "extract" or log from input text an item of information herein called an event. Extracting an event from text typically involves recognizing a group of entities (words or phrases representative of objects or concepts) of specific types that have particular relationships between them. Entities are generally expressed as noun phrases. To recognize an event in a sentence, a system must identify the entities of interest and determine that the syntactic and semantic relationships within the sentence indicate the event and the entities' roles in it.

An exemplary domain of application of a system according to the invention is the extraction of information about business management changes in the domain of management change events. This domain has been selected as being illustrative but not limiting as to the applicability of the invention to identify information events.

In the domain of management change events, the entities of interest are companies, people, and management titles (e.g., "vp of finance", "CEO", etc.). A variety of syntactic and semantic relationships between these entities in a sentence can indicate a management change event.

NLP-based extraction techniques, as opposed to simple keyword, proximity, or topic/entity searches, are needed for reasonably accurate extraction for this task. Not every combination of person/company/title in close proximity indicates a management change, even when other keyword indicators (e.g., named, announced, appointed, etc.) are nearby. For example, consider the following sample news release: "NORTH STONINGTON, Connecticut (Business Wire)—Dec. 2, 1994— Joseph M. Marino and Richard P. Mitchell have been named senior vice presidents of Analysis & Technology Inc. (NASDAQ NMS: AATI), Gary P. Bennett, president and CEO, has announced."

In this example, Joseph M. Marino and Richard P. Mitchell participate in management changes, but Gary P. Bennett does not, despite the mention of both a company and a title near his name. The present system learns patterns that are useful for correctly handling and extracting relevant events from such texts, more accurately and completely than keyword, proximity, or topic/entity search retrieval techniques.

Figure 2:
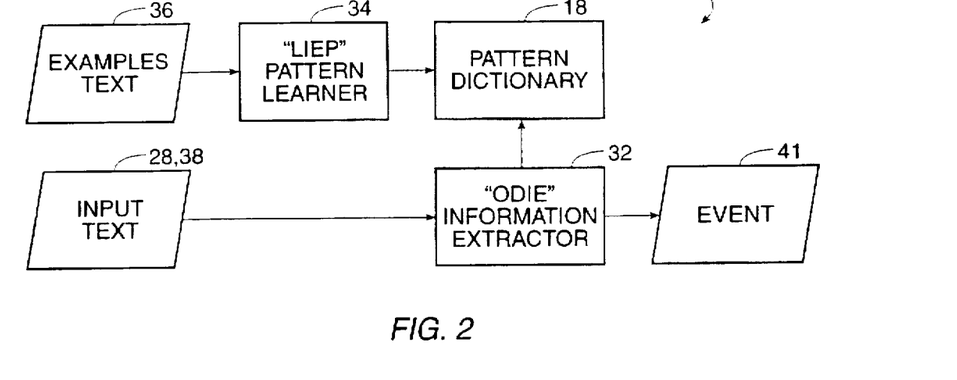
FIG. 2 is a functional block diagram of a system according to the invention.

Referring to FIG. 2, the extraction system 100 learns extraction patterns on demand. Referred to as the ODIE system 32 (for "On-Demand Information Extractor"), it processes input text 28, 38 using a set of patterns from a pattern dictionary 40 (i.e., in mass storage 40) specially prepared by a pattern learning system 34 using examples 36 to identify a class of events 41 to be extracted or logged from the input text 28, 38.

Figure 3:
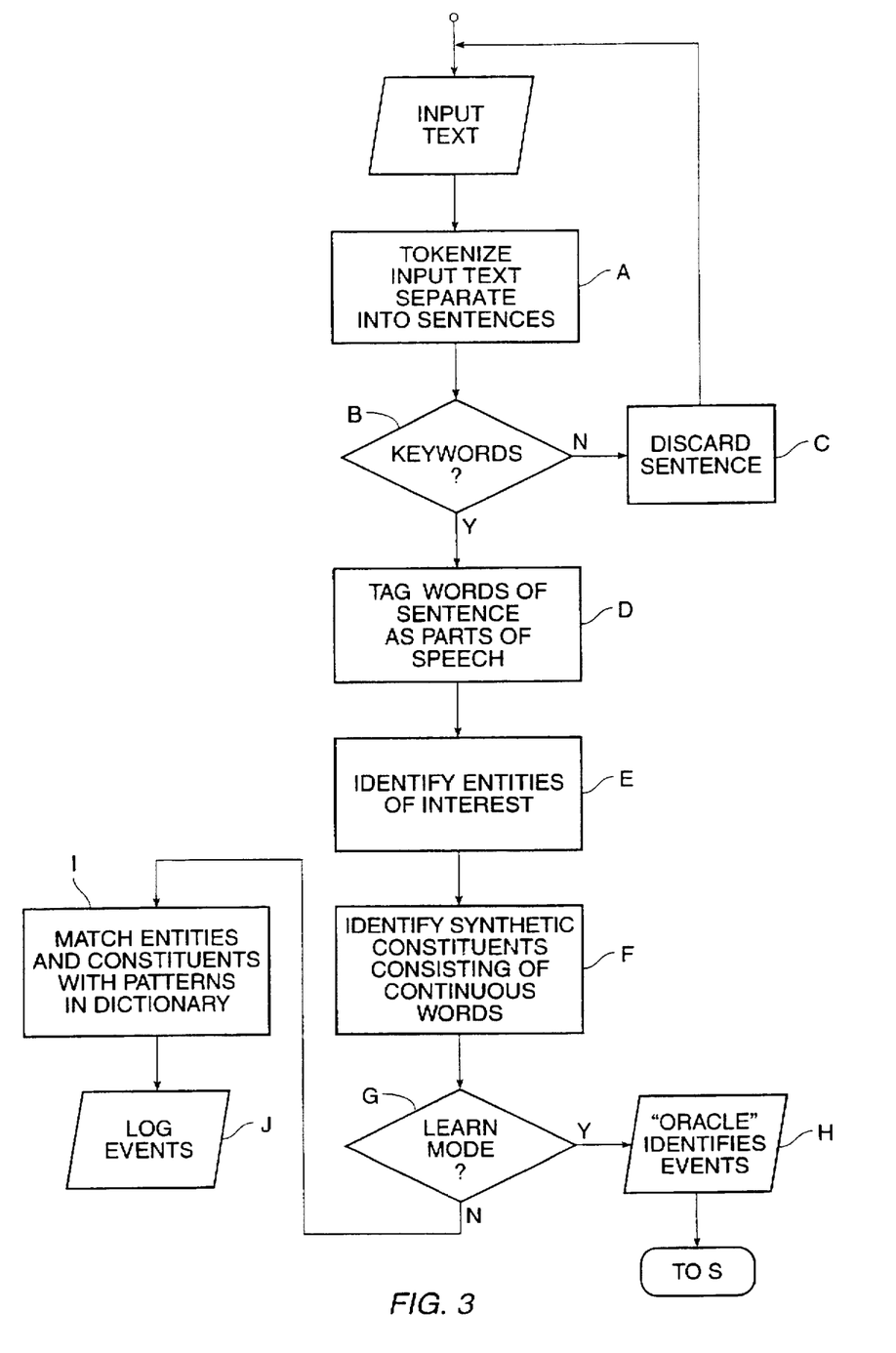
FIG. 3 is a flow chart illustrating operation of the information extraction process according to the invention.

Referring to FIG. 3, given an input text, the ODIE system 32 first tokenizes the text and breaks it into sentences (Step A). For each sentence, ODIE checks whether the sentence contains any of a set of keywords that indicate the possibility that the sentence expresses an event of interest (Step B). If no keywords are found, the sentence is thrown away (Step C); otherwise, the words in the sentence are tagged with their parts of speech (Step D). (A part-of-speech detector designed and described by Eric Brill is useful for this purpose. Others may also be used.)

Figure 5:
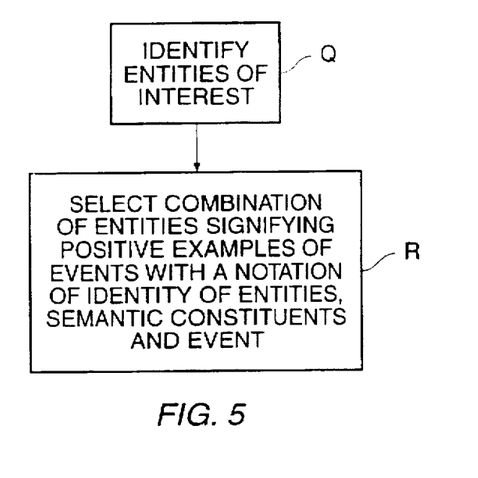
FIG. 5 is a flow chart illustrating another aspect of a pattern learning process according to the invention.

Next, entities of interest are identified (Step E) and then syntactic constitutents consisting of contiguous words are identified (Step F) (and at least temporarily stored). For management changes, the entities of interest are "people," "company names," and "management titles". Syntactic constituents include noun groups, verb groups, and prepositions. The grammars used for identifying noun and verb groups are loosely based on those used by FASTUS, referenced above. If the system is in the learning mode, i.e., the input text is the example text used for training the system, (Step G), an "oracle" or superuser identifies the entities of interest that constitute valid events (Step H), as explained below (FIG. 5).

Finally (Step I) the ODIE system matches the entities and constituents with patterns in a pattern dictionary of previously-stored patterns to identify valid events. An example of a pattern is as follows:

--- n_was_named_t_by_c:
   noun-group(PNG,head(isa(person-name))),
   noun-group(TNG,head(isa(title))),
   noun-group(CNG,head(isa(company-name))),
   verb-group(VG,type(passive),head(named or elected or appointed)),
   preposition(PREP,head(of or at or by)),
   subject(PNG,VG),
   object(VG,TNG),
   post_nominal_prep(TNG,PREP),
   prep_object(PREP,CNG)
==> management_appointment(M,person(PNG),title(TNG), company(CNG)).

---

As this example shows, patterns match syntactic constituents by testing head words/entities and other simple properties (e.g. active/passive for verb groups) of constituents, and by attempting to verify syntactic relationships between the constituents. If all of the syntactic relationships are verified, such as described in connection with FIG. 4, an information event (e.g., a corporate or business entity management change event) is logged (Step J).

Rather than construct a complete and consistent parse of the entire sentence, the ODIE system according to the invention (FIG. 4) attempts merely to verify the plausibility of specific syntactic relationships between pairs of constituents tested in extraction patterns. A relationship's plausibility is verified using local syntactic constraints. For instance, the relationship (under Step G) expressed by "subject(ng, vg)" is considered to hold (Step L) if the noun-group "ng" is located directly to the left of (i.e., before) the verb-group "vg" (Step M), or if "ng" is further to the left (Step N), and everything in between "ng" and "vg" could possibly be a right-modifier of "ng" (Step O). (Examples of possible right-modifiers of a noun-group "ng" are prepositional phrases, comma-delimited strings of words, parentheticals, etc.) Otherwise the relationship expressed by "subject(ng, vg)" is considered not to hold, and is logged as not plausible (Step P).

Figure 4:
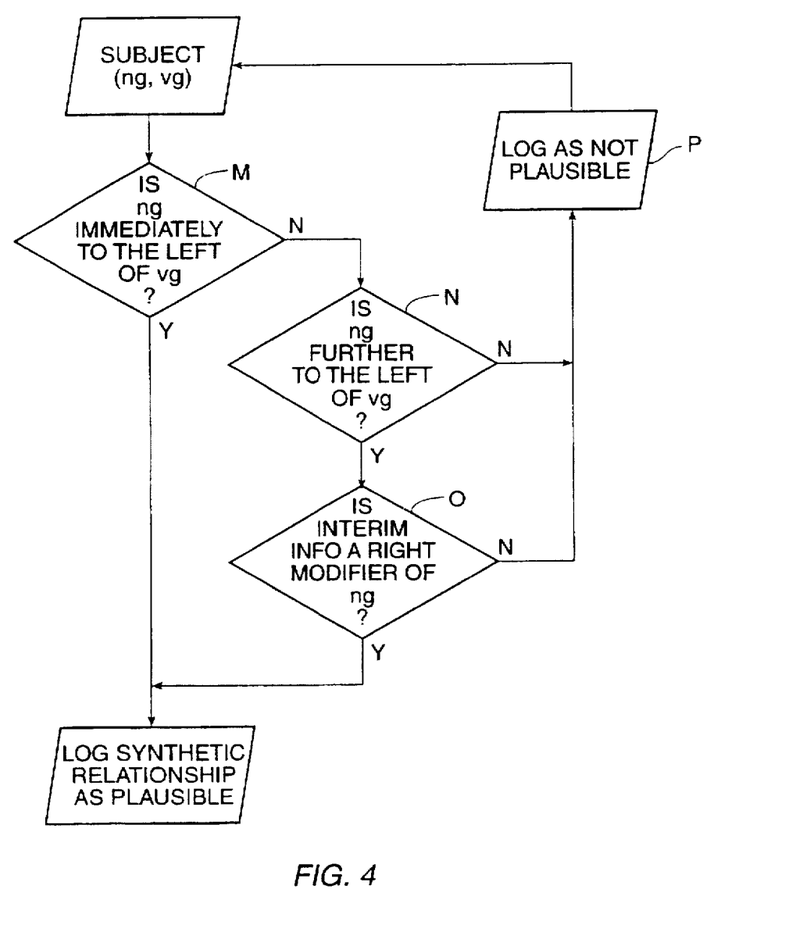
FIG. 4 is a flow chart illustrating one aspect of a pattern learning process according to the invention.

Similar plausibility judgments are made for other syntactic relationships such as "object", "post-nominal-preposition", "preposition-object", etc.

Performing simple, local plausibility verifications "on demand" for only the syntactic relationships in extraction patterns can be contrasted with the "full parsing" of standard NLP systems. The advantage of on-demand parsing is the avoidance of the difficult, time-consuming and semantic-knowledge-intensive process of full parsing. However, the local, non-semantic nature of on-demand parsing can allow the set of syntactic relationships considered to hold in a sentence to be underconstrained. For example, multiple noun groups can plausibly possess the "subject" relationship with a given verb group in a sentence. In a full parsing system, complex semantic constraints would be applied to determine a single "subject" noun group for each verb group. In on-demand parsing, such complex semantic constraints are not used; instead, constraint is provided by the fact that the system only considers sets of syntactic relationships appearing within specific extraction patterns.

When applying a given extraction pattern to a sentence, the method of the present invention using the ODIE system never generates all possible "subject" noun groups for a verb group. Rather, it only checks whether any noun group with the particular type of head tested in the given extraction pattern can plausibly fit that relationship. That relationship is only "accepted" (affects the system's output) if the rest of the relationships in the pattern are also plausible. This provides enough constraint to avoid most incorrect interpretations (spurious loggings of events).

An object is to produce fully user-trainable extraction systems that allow a novice user to build a new dictionary of extraction patterns simply by indicating a few examples of a new event of interest. Thus, according to an important aspect of the invention, information extraction patterns are learned by a learning extraction (LIEP) system from example texts containing events of relevance. The LIEP system allows a user acting as an "oracle" to interactively identify events in texts.

Referring to FIG. 5, for each potential training sentence, entities of interest (e.g. people, companies, and titles) are identified (Step Q), and the user can thereafter choose which combinations of the entities signify events to be extracted (Step R). An event (e.g., a management change) includes a set of roles (e.g., person, title, company) with specific entities filling each role. Each positive example thus consists of a sentence processed to identify entities and syntactic constituents, and an event that occurs in the sentence.

Figure 6:
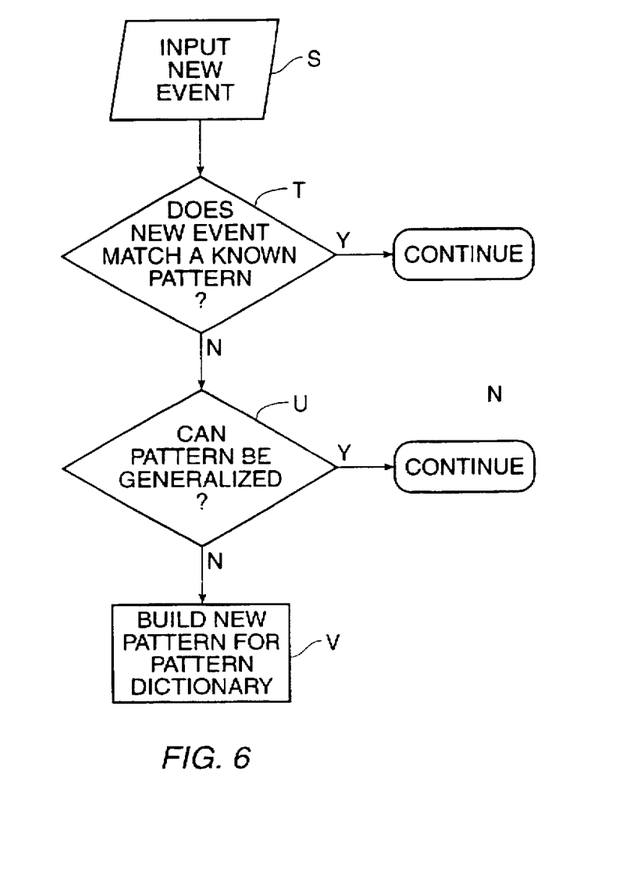
FIG. 6 is a flow chart illustrating another aspect of a pattern learning process according to the invention.

The LIEP system attempts to build a set of extraction patterns that will maximize the number of extractions of positive examples and minimize spurious extractions. Referring to FIG. 6, given a new example of an event (Step S) that is not already matched by a known pattern (Step T), the LIEP system first attempts to generalize a known pattern to cover the example (Step U). If generalization is not possible or fails to produce a high-quality pattern, the LIEP system builds a new pattern based on the example (Step V). Consider first how new patterns are built, and then how they are generalized.

The LIEP system creates potential patterns from an example sentence/event by searching for sets of relationships that relate all of the role-filling constituents in the event to one another. Since the example extraction task herein has three constituents, the LIEP system attempts to find paths of relationships between each pair of constituents (three pairs) and then merges those paths to create sets of relationships relating all three.

The relationship between a pair of constituents can either be direct—as between ng and vg if subject(ng,vg) holds—or indirect, where the constituents are the endpoints of a path of relationships that passes through other intermediate constituents. Such intermediate constituents are included as part of a pattern construct only when needed to relate role-filling constituents. For instance, in (1) "Bob was named CEO of Foo Inc.", Bob and CEO are related by: (subject(Bob,named),object (named,CEO))

To find relationships between pairs of constituents, the LIEP system uses the recursive, depth-first algorithm shown below:

```
find_relationships(C1,C2,) {
    if direct_relationship(C1,C2,R)then return(R)
    else
    while (choose_next_intermediate_constituent(CIntermediate)) {
        Rels1 = find_relationships(C1,CIntermediate)
        Rels2 = find_relationships(C2,CIntermediate)
        return(Rels1 + Rels2)}
    else failure.}
```

The LIEP system operating according to this algorithm first tries to find a direct relationship between the constituents. If there is none, it chooses another constituent in the sentence and tries to find paths of relationships between each of the original constituents and this intermediate constituent. The expression Choose_next_intermediate_constituent selects intermediate constituents to use starting from the rightmost constituent between the two being related, and moving left to the beginning of the sentence.

In many cases, there are multiple paths of relationships between a pair of constituents. The multiple paths very roughly correspond to multiple syntactic parses of the sentence. For instance, in the above sentence, "of Foo Inc." could modify the verb "named" or the noun "CEO". Thus, "Bob" and "Foo Inc." are related by both:

```
|subject(Bob,named),object(named,CEO),
post_verbal_post_object_prep(named,of),
prep_object(of,Foo Inc.)|
```
and:
```
|subject(Bob,named),object(named,CEO),
post_nominal_prep(CEO,of),
prep_object(of,Foo Inc.)|
```

The LIEP system does not reason about what "of Foo Inc." modifies; it simply generates both of the possibilities because the ODIE system's plausible syntactic knowledge indicates that both "post_-verbal_-post_-object_-prep (named,of)" and "post_-nominal_-prep(CEO,of)" hold.

In cases where no path of relationships between a pair of constituents can be found, it is an indication that the ODIE system's set of syntactic relationships (which is very simple) is insufficient to cover the example. A common example of this occurs because the ODIE system does not understand parallel structure, as in "Foo Inc. named Bob CEO, and Jane president." ODIE cannot relate "Foo Inc." to "Jane" or "president" because it cannot recognize their relationships to the verb. Thus the LIEP system cannot create a pattern from the example:

"company(Foo Inc.), person(Jane), title(president)".

This is not a weakness in the learning algorithm, but a characteristic of the syntactic vocabulary used to analyze the examples: in machine learning terms, this is known as "representation bias."

The following figure shows the routine build-new-pattern (Example), which produces a new potential pattern given a positive example of an event.

```
build_new_pattern(Example) {
    HighestAccuracy = 0,Result = failure
    do 3 times {
        Rels =      find_relationships_between_role_fil-
        lers(Example)
        if(Rels != failure)then {
            Pattern = create_pattern_from_relationships(Rels)
            Acc = compute_f_score_on_old_examples(Pattern)
            if Acc > HighestAccuracy then {
                HighestAccuracy = Acc
                Result = Pattern }}}
    return(Result).}
```

Find-relationships-between-role-fillers simply calls find-relationships for each pair of roles in the example event and merges the resulting sets of relationships. Calling it multiple times causes find-relationships to backtrack and find multiple paths between constituents if they exist. Currently, it has arbitrarily been set to generate up to three sets of relationships between the role-filler constituents. Create-pattern-from-relationships converts each set of relationships into an new extraction pattern in the following way. It includes in the new pattern tests for each of the relationships themselves, and also adds a test for each constituent appearing in the set of relationships. These constituent tests match the constituents' head words or entities, and other simple syntactic properties (e.g. active/passive for verb-groups).

As an example, consider again (1) "Bob was named CEO of Foo Inc." The first set of relationships Find-relationships-between-role-fillers finds relating Bob, CEO}, and Foo Inc. is:

```
|subject(Bob,named),object(named,CEO),
post_verbal_post_object_prep(named,of),
prep_object(of,Foo Inc.)|
```

From these, create_pattern_from_relationships creates the pattern:

```
LIEP_pattern1:
    noun-group(PNG,head(isa(person-name))),
    noun-group(TNG,head(isa(title))),
    noun-group(CNG,head(isa(company-name))),
    verb-group(VG,type(passive),head(named)),
    preposition(PREP,head(of)),
    subject(PNG,VG),
    object(VG,TNG),
    post_verbal_post_object_prep(VG,PREP),
    prep_object(PREP,CNG)
    => management_appointment(M,
        person(PNG),title(TNG),company(CNG)).
```

After up to three such patterns are constructed, they are compared by running them on all the example sentences LIEP has seen so far. The pattern with the highest F-measure (a metric) is returned and added to the system's dictionary. (The F-measure, as defined in the literature by Chinchor and Sundheim, "MUC-5 evaluation metrics," *Proceedings of the fifth Message Understanding Conference* (MUC-5), Morgan Kaufman, San Mateo, Calif., 1993, balances the recall and precision performance of the pattern being tested. For these tests, beta=1.0.)

The new patterns the LIEP system learns are fairly specific: for non-role-filler constituents, they test for specific properties and head words (e.g., named). Often, later training examples have the same syntactic relationships as a previously learned pattern, but with different constituent head words or properties. This indicates that the pattern can be generalized.

The LIEP system assumes that non-role-filler constituents' head words and properties within a pattern can be generalized, but that constituents' syntactic types and relationships—what might be called the pattern's "syntactic footprint"—should not be generalized. For instance, if the LIEP system sees a future example which is similar to LIEP_pattern1 except that subject(PNG,VG) is replaced with some other relationship, it will not try to generalize LIEP_pattern1 but rather create a completely new pattern.

In order to recognize when a pattern might be generalized based on a new example, while learning a new pattern the LIEP system also creates a special version of the pattern that tests only its "syntactic footprint"—that is, the non-generalizable parts of the full pattern. For LIEP_pattern1, this is:

```
LIEP_pattern1(NON-GENERALIZABLE-PORTION):
    noun-group(PNG,head(isa(person-name))),
    noun-group(TNG,head(isa(title))),
    noun-group(CNG,head(isa(company-name))),
    verb-group(VG,preposition(PREP),
    subject(PNG,VG),
    object(VG,TNG),
    post_verbal_post_object_prep(VG,PREP),
    prep_object(PREP,CNG)
```

```
    => matches_positive_example(
        person(PNG),title(TNG),company(CNG)).
```

Notice that LIEP_pattern1 (NON-GENERALIZABLE-PORTION) is exactly the same as LIEP_pattern1 except that tests for specific non-role-filler words ("named" and "of") and properties ("passive") are removed.

Consider the example (2) "Joan has been appointed vp, finance, at XYZ Company." Although it uses different head words, this example has the same syntactic relationships between its person, title, and company constituents as the previous example that resulted in LIEP_pattern1. When it begins processing example (2), the LIEP system notices the similarity because LIEP_pattern1(NON—GENERALIZABLE—PORTION) matches the new example. Thus, instead of learning a new pattern for (2), the system forms a generalization of LIEP-pattern1 by inserting disjunctive values within each generalizable test in the pattern. These disjunctive values match the value(s) already in the pattern, plus the value in the new example. The generalized version of LIEP_pattern1 that results is:

```
Gen1_LIEP_pattern1:
    noun-group(PNG,head(isa(person-name))),
    noun-group(TNG,head(isa(title))),
    noun-group(CNG,head(isa(company-name))),
    verb-group(VG,type(passive),
        head(member(genclass1))),
    preposition(PREP,head(member(genclass2))),
    subject(PNG,VG),
    object(VG,TNG),
    post_verbal_post_object_prep(VG,PREP),
    prep_object(PREP,CNG)
    => management_appointment(M,
        person(PNG),title(TNG),company(CNG)).
genclass1 = (named,appointed).
genclass2 = (of,at).
```

This pattern matches both examples (1) and (2).

Once such a generalized pattern is formed, the LIEP system tests it by computing its F-measure and comparing it to the F-measure of the original pattern. If the generalized pattern's F-measure is better, it is added and the old pattern is thrown away; otherwise the generalization is thrown away, and a fully new pattern is learned for the example.

Later examples can cause further generalizations (further additions to the disjunctive value sets, which the LIEP system calls genclasses). In addition, for open-class words (nouns and verbs), the LIEP system re-uses the genclasses it learns across patterns. For instance, if it has learned a genclass containing named, appointed, and elected by generalizing a pattern, when generalizing some other pattern containing named, it will use that genclass instead of creating a new one. For closed-class items like prepositions, the LIEP system always creates a new genclass for each rule, because those items are often used in a context-specific way.

To test performance, a corpus of 300 naturally-occurring texts reporting management changes was collected. The corpus was drawn from newswire articles appearing in the Wall Street Journal, New York Times, Business Wire, PR Newswire, and other newswire services, in January and early February 1995. Each corpus text contained either one or two sentences from a newswire article. Many of the corpus sentences were complex, and contained multiple names and companies. Often, more than one management change was reported in a single sentence, either through multiple complete clauses or parallel structure.

The LIEP system was executed multiple times over randomly-chosen training sets of different sizes. For each run, the LIEP system was trained using some number of randomly selected training texts (averaged over five runs) from the 300-text corpus, and then its performance was tested on a disjoint set of 100 randomly selected test texts from the corpus. The ODIE system's average F-measure using a hand-built set of patterns on randomly selected sets of 100 test texts from the corpus is 89.4% (recall 85.9% precision 93.2% averaged over ten runs). After 150 training texts, the LIEP system reached an average F-measure of 85.2% (recall 81.6% precision 89.4%)—a difference of less than five percent from the hand-built patterns.

As the number of training examples is increased, the number of new patterns the LIEP system must learn begins to level off as expected as more of the learning involves generalizing previously learned patterns.

The invention has now been explained with reference to specific embodiments. Other embodiments will be apparent to those of ordinary skill in the art. It is therefore not intended that the invention be limited, except as indicated by the appended claims.

What is claimed is:

1. In a computer-based information extraction system having text as input and events as output, a method for learning information extraction patterns for use in logging events, said learning method comprising the steps of:

a) presenting an example sentence to a pattern learning engine;

b) identifying to said pattern learning engine a valid event, said valid event comprising a set of syntactic constituents from within said example sentence; and c) determining whether said example sentence and its corresponding valid event is not already matched by any known pattern, wherein said determining step comprises:

segmenting said example sentence into in a series of syntactic constituents, each said syntactic constituent containing a head word/head entity characterizing said syntactic constituent; and matching each said head word/entity and selected other syntactic properties of said series of syntactic constituents against said known patterns in order to verify plausibility of specific syntactic relationships between said syntactic constituents of the event under test;

and, if the example sentence and its valid event are not matched by any of said known patterns, d) attempting to generalize one of said known patterns to match the example sentence with its corresponding valid event; and, if no acceptable resultant pattern is produced, e) building, in said learning engine, a new grammar pattern based on said example sentence and its corresponding valid event, for use in constructing subsequent valid events from subsequent input sentences which are input to said information extraction system.

2. In the computer-based system according to claim 1, wherein said new pattern building step (e) includes:

producing potential patterns from the example by:

searching for sets of plausible syntactic relationships that relate all role-filling constituents in the example to one another, the role-filling constituents being syntactic constituents in the input example sentence that are referenced in the output event of the example.

3. In the computer-based system according to claim 2, wherein said searching step comprises:

finding a path of said plausible syntactic relationships between each pair of said role-filling constituents, a path being a chain of syntactic relations from a beginning to an end of said role-filling constituents; and merging said paths to create a single set of said plausible syntactic relationships relating all said role-filling constituents.

4. In the computer-based system according to claim 3, wherein said finding step comprises:

locating direct relationships in order to produce said paths; and locating indirect relationships through intermediate constituents in absence of direct relationships to produce said paths.

5. In a computer-based information extraction system having text as input and events as output, a method for learning information extraction patterns for use in logging events, said method comprising the steps of:

presenting a plurality of example sentences to a pattern learning engine;

identifying to said pattern learning engine valid events that consist of sets of constituents from within said example sentences; and building, in said learning engine, grammar patterns based on said identified valid events for use in constructing subsequent valid events from subsequent input sentences which are input to said information extraction system;

wherein said identifying step allows a user to interactively identify events and roles in texts, said step comprising:

flagging, by said learning engine in each potential training sentence, entities of interest;

presenting by said learning engine to the user a choice of combinations of the entities which signify potential valid events; and receiving by said learning engine indications by the user that selected entities constitute valid events and indications that specific entities of interest fill specific roles in order to establish a positive example of an actual training sentence identifying said selected entities, selected syntactic constituents, and an event that occurs in said actual training sentence;

wherein said grammar pattern building step comprises:

determining whether a new example is not already matched by any known pattern;

attempting to generalize one of said known patterns to cover the example; and if no acceptable pattern is produced building a new pattern based on the new example;

wherein said determining step comprises testing head entities and word group properties to verify plausibility of specific syntactic relationships between pairs of constituents;

wherein said new pattern building step includes:

producing potential patterns from the example by:

searching for sets of plausible syntactic relationships that relate all role-filling constituents in the example to one another, the role-filling constituents being syntactic constituents in the input example sentence that are referenced in the output event of the example;

wherein said searching step comprises:

finding a path of said plausible syntactic relationships between each pair of said role-filling constituents a path being a chain of syntactic relations from a beginning to an end of said role-filling constituents; and merging said paths to create a set of said plausible syntactic relationships relating all said role-filling constituents;

wherein said finding step comprises:
 locating direct relationships to produce said paths; and
 locating indirect relationships through intermediate constituents in absence of direct relationships to produce said paths; and wherein said new pattern building step further comprises:

producing potential patterns from the example; and selecting from said potential patterns a best pattern for addition to a pattern dictionary, said best pattern being selected by:

measuring, on a set of valid examples consisting of input sentences and output events to be extracted, output event extraction accuracy of each said potential pattern, said output events being extracted from said input sentences, and by choosing the most accurate of the potential patterns.

\* \* \* \* \*